United States Patent
Hatheway et al.

(10) Patent No.: US 8,401,943 B2
(45) Date of Patent: Mar. 19, 2013

(54) PRICING MECHANISM FOR SECURITY VALUATION

(75) Inventors: Frank Hatheway, Chevy Chase, MD (US); Marianne Baldrica, Los Altos, CA (US)

(73) Assignee: The NASDAQ OMX Group, Inc., New York, NY (US)

( * ) Notice: Subject to any disclaimer, the term of this patent is extended or adjusted under 35 U.S.C. 154(b) by 623 days.

(21) Appl. No.: 12/489,661

(22) Filed: Jun. 23, 2009

(65) Prior Publication Data

US 2010/0030681 A1  Feb. 4, 2010

Related U.S. Application Data

(63) Continuation-in-part of application No. 12/274,079, filed on Nov. 19, 2008.

(60) Provisional application No. 60/989,390, filed on Nov. 20, 2007.

(51) Int. Cl.
*G06Q 40/00* (2012.01)

(52) U.S. Cl. ........................................... 705/35

(58) Field of Classification Search .................... 705/30, 705/35
See application file for complete search history.

(56) References Cited

U.S. PATENT DOCUMENTS

| | | | |
|---|---|---|---|
| 6,016,483 A | 1/2000 | Rickard et al. | |
| 6,064,986 A * | 5/2000 | Edelman | 705/36 R |
| 6,161,099 A | 12/2000 | Harrington et al. | |
| 7,099,839 B2 | 8/2006 | Madoff et al. | |
| 7,162,448 B2 | 1/2007 | Madoff et al. | |
| 2002/0023035 A1 | 2/2002 | Kiron et al. | |
| 2002/0087373 A1 | 7/2002 | Dickstein et al. | |
| 2003/0083972 A1 * | 5/2003 | Williams | 705/36 |
| 2004/0068464 A1 | 4/2004 | Buchanan et al. | |
| 2004/0133516 A1 | 7/2004 | Buchanan et al. | |
| 2004/0267656 A1 * | 12/2004 | Friedman et al. | 705/37 |
| 2005/0021466 A1 | 1/2005 | Buchanan et al. | |
| 2005/0108120 A1 * | 5/2005 | Malka et al. | 705/35 |
| 2005/0144103 A1 * | 6/2005 | Perg et al. | 705/35 |
| 2005/0165669 A1 * | 7/2005 | Montanaro et al. | 705/37 |
| 2006/0036531 A1 * | 2/2006 | Jackson et al. | 705/37 |
| 2006/0143099 A1 * | 6/2006 | Partlow et al. | 705/35 |
| 2006/0155627 A1 * | 7/2006 | Horowitz | 705/35 |
| 2006/0184446 A1 | 8/2006 | Ross | |
| 2006/0212380 A1 * | 9/2006 | Williams et al. | 705/35 |
| 2007/0022035 A1 | 1/2007 | Seaman et al. | |
| 2007/0022038 A1 | 1/2007 | Seaman et al. | |
| 2007/0112658 A1 | 5/2007 | Dryden | |
| 2007/0136181 A1 | 6/2007 | Miller | |
| 2008/0243721 A1 * | 10/2008 | Joao | 705/36 R |
| 2009/0276372 A1 | 11/2009 | Wallman | |

OTHER PUBLICATIONS

AES corp. Annual/10K report—2002. (2002). ( ). United States: ProQuest Annual Reports. Retrieved from http://search.proquest.com/docview/190629943?accountid=14753.*
U.S. Appl. No. 12/274,209, filed Nov. 19, 2008; Inventor: Frank Hatheway et al.
Office Action mailed Mar. 31, 2011 in U.S. Appl. No. 12/274,079.
Office Action mailed Oct. 12, 2011 in U.S. Appl. No. 12/274,079.

* cited by examiner

*Primary Examiner* — Seye Iwarere
(74) *Attorney, Agent, or Firm* — Nixon & Vanderhye P.C.

(57) ABSTRACT

Techniques and systems for determining a valuation for securities that do not have an established valuation mechanism are described herein. Derivative securities based on underlying employee stock options where the maturity of the derivative security is tied to exercise and forfeiture behaviors of individuals owning the stock options are also described herein.

22 Claims, 10 Drawing Sheets

| Employee 52 | Options 54 | 100% Vested 56 | 57 | Exercise & Forfeiture | | | |
|---|---|---|---|---|---|---|---|
| | | | | Q1 58a | Q2 58b | Q3 58c | Q4 58d |
| X | 1,000 | 1000 | Exercise | 100 | 100 | 300 | 500 |
| | | | Forfeiture | | | | |
| Y | 5,000 | 5000 | Exercise | | 500 | 4,500 | |
| | | | Forfeiture | | | | |
| Z | 4,000 | 4000 | Exercise | | 400 | | |
| | | | Forfeiture | | 3,600 | | |
| Total | 10,000 | 10,000 | Exercise | 100 | 1,000 | 4,800 | 500 |
| | | | Forfeiture | | 3,600 | | |

| Investor 60 | Security Contracts (individual securities) 62 | Expiration | | | |
|---|---|---|---|---|---|
| | | Q1 64a | Q2 64b | Q3 64c | Q4 64d |
| A | 3(300) | 3 | 138 | 144 | 15 |
| B | 3(300) | 3 | 138 | 144 | 15 |
| C | 4(400) | 4 | 184 | 192 | 20 |
| Total | 10(1,000) | 10 | 460 | 480 | 50 |

FIG. 3

| Employee 52 | Options 54 | 100% Vested | 57 | Exercise & Forfeiture | | | |
|---|---|---|---|---|---|---|---|
| | | | | Q1 58a | Q2 58b | Q3 58c | Q4 58d |
| X | 1,000 | 1000 | Exercise | | 200 | 300 | 500 |
| | | | Forfeiture | | | | |
| Y | 5,000 | 5000 | Exercise | | 500 | 600 | 3,900 |
| | | | Forfeiture | | | | |
| Z | 4,000 | 0 | Exercise | | | | |
| | | | Forfeiture | 4,000 | | | |
| Total | 10,000 | 6,000 | Exercise | 4,000 | 700 | 900 | 4,400 |
| | | | Forfeiture | | | | |

| Investor 60 | Security Contracts (individual securities) 62 | Expiration | | | |
|---|---|---|---|---|---|
| | | Q1 58a | Q2 58b | Q3 58c | Q4 58d |
| A | 3(300) | 120 | 21 | 27 | 132 |
| B | 3(300) | 120 | 21 | 27 | 132 |
| C | 4(400) | 160 | 28 | 36 | 176 |
| Total | 10(1,000) | 400 | 70 | 90 | 440 |

FIG. 4

|  | | | Exercise & Forfeiture | | | |
|---|---|---|---|---|---|---|
| Employee 52 | Options 54 | 100% Vested | 57 | Q1 58a | Q2 58b | Q3 58c | Q4 58d |
| X | 1,000 | 1000 | Exercise | | 200 | 300 | 500 |
|   |       |      | Forfeiture | | | | |
| Y | 5,000 | 5000 | Exercise | | 500 | 600 | 3,900 |
|   |       |      | Forfeiture | | | | |
| Z | 4,000 | 0 | Exercise | | | | |
|   |       |   | Forfeiture | 4,000 | | | |
| Total | 10,000 | 6,000 | Exercise | | 700 | 900 | 4,400 |
|       |        |       | Forfeiture | 4,000 | | | |

|  | | Expiration | | | |
|---|---|---|---|---|---|
| Investor 60 | Security Contracts (individual securities) 62 | Q1 58a | Q2 58b | Q3 58c | Q4 58d |
| A | 3(300) | | 35 | 45 | 220 |
| B | 3(300) | | 35 | 45 | 220 |
| C | 4(400) | | 46.6667 | 60 | 293.333 |
| Total | 10(1,000) | 0 | 116.667 | 150 | 733.333 |

FIG. 5

| Employee 52 | Options 54 | 100% Vested | 57 | Exercise & Forfeiture | | | |
|---|---|---|---|---|---|---|---|
| | | | | Q1 58a | Q2 58b | Q3 58c | Q4 58d |
| X | 1,000 | 1000 | Exercise | 100 | 100 | | 800 |
| | | | Forfeiture | | | | |
| Y | 5,000 | 5000 | Exercise | | 500 | | 4,500 |
| | | | Forfeiture | | | | |
| Z | 4,000 | 4000 | Exercise | | 400 | 3,600 | |
| | | | Forfeiture | | | | |
| Total | 10,000 | 10,000 | Exercise | 100 | 1,000 | 3,600 | 5,300 |
| | | | Forfeiture | | | | |

| Investor 60 | Security Contracts (individual securities) 62 | Expiration | | | |
|---|---|---|---|---|---|
| | | Q1 58a | Q2 58b | Q3 58c | Q4 58d |
| A | 3(300) | 3 | 30 | 108 | 159 |
| B | 3(300) | 3 | 30 | 108 | 159 |
| C | 4(400) | 4 | 40 | 144 | 212 |
| Total | 10(1,000) | 10 | 100 | 360 | 530 |

FIG. 6

| Employee 52 | Options 54 | 100% Vested 56 | 57 | Exercise & Forfeiture | | | |
|---|---|---|---|---|---|---|---|
| | | | | Q1 58a | Q2 58b | Q3 58c | Q4 58d |
| Eric | 1,000 | 1000 | Exercise | 100 | 100 | 300 | 500 |
| | | | Forfeiture | | | | |
| Frank | 5,000 | 5000 | Exercise | | 500 | 600 | 3,900 |
| | | | Forfeiture | | | | |
| Jeff | 4,000 | 4000 | Exercise | | 400 | 1,600 | |
| | | | Forfeiture | | | 2,000 | |
| Total | 10,000 | 10,000 | Exercise | 100 | 1,000 | 2,500 | 4,400 |
| | | | Forfeiture | | | 2,000 | |

| Investor 60 | Security Contracts (individual securities) 62 | | | Expiration | | | |
|---|---|---|---|---|---|---|---|
| | | | | Q1 58a | Q2 58b | Q3 58c | Q4 58d |
| A | 3(300) | | | 3 | 30 | 135 | 132 |
| B | 3(300) | | | 3 | 30 | 135 | 132 |
| C | 4(400) | | | 4 | 40 | 180 | 176 |
| Total | 10(1,000) | | | 10 | 100 | 450 | 440 |

FIG. 7

| Employee 52 | Options 54 | 100% Vested 56 | 57 | Exercise & Forfeiture | | | |
|---|---|---|---|---|---|---|---|
| | | | | Q1 58a | Q2 58b | Q3 58c | Q4 58d |
| X | 1,000 | 1000 | Exercise | 100 | 100 | | 800 |
| | | | Forfeiture | | | | |
| Y | 5,000 | 5000 | Exercise | | 500 | | 4,500 |
| | | | Forfeiture | | | | |
| Z | 4,000 | 4000 | Exercise | | 400 | 3,600 | |
| | | | Forfeiture | | | | |
| Total | 10,000 | 10,000 | Exercise | 100 | 1,000 | 3,600 | 5,300 |
| | | | Forfeiture | 0 | 0 | 0 | 0 |

| Investor 60 | Security Contracts (individual securities) 62 | Expiration | | | |
|---|---|---|---|---|---|
| | | Q1 58a | Q2 58b | Q3 58c | Q4 58d |
| A | 3(300) | 3 | 30 | | 267 |
| B | 3(300) | 3 | 30 | | 267 |
| C | 4(400) | 4 | 40 | | 356 |
| Total | 10(1,000) | 10 | 100 | | 890 |

FIG. 8

| Employee 52 | Options 54 | 100% Vested | 57 | Exercise & Forfeiture | | | |
|---|---|---|---|---|---|---|---|
| | | | | Q1 58a | Q2 58b | Q3 58c | Q4 58d |
| X | 1,000 | 1000 | Exercise | 100 | 100 | 300 | 500 |
| | | | Forfeiture | | | | |
| Y | 5,000 | 5000 | Exercise | | 500 | 600 | 3,900 |
| | | | Forfeiture | | | | |
| Z | 4,000 | 4000 | Exercise | | 400 | 1,600 | |
| | | | Forfeiture | | | 2,000 | |
| Total | 10,000 | 10,000 | Exercise | 100 | 1,000 | 2,500 | 4,400 |
| | | | Forfeiture | 0 | 0 | 2,000 | 0 |

| Investor 60 | Security Contracts (individual securities) 62 | | Expiration | | | |
|---|---|---|---|---|---|---|
| | | | Q1 58a | Q2 58b | Q3 58c | Q4 58d |
| A | 3(300) | | 3 | 30 | 102 | 165 |
| B | 3(300) | | 3 | 30 | 102 | 165 |
| C | 4(400) | | 4 | 40 | 136 | 220 |
| Total | 10(1,000) | | 10 | 100 | 340 | 550 |

FIG. 9

PRICING MECHANISM FOR SECURITY VALUATION

CROSS REFERENCE TO RELATED APPLICATIONS

Pursuant to 35 USC §120, this application is a continuation-in-part and claims the benefit of U.S. application Ser. No. 12/274,079, filed Nov. 19, 2008, which in turn claims the benefit of U.S. Provisional Application Ser. No. 60/989,390, filed Nov. 20, 2007, both of which are incorporated by reference in their entireties.

BACKGROUND

Techniques and systems for determining a valuation for securities that do not have an established valuation mechanism are described herein. Derivative securities based on underlying employee stock options where the maturity of the derivative security is tied to exercise and forfeiture behaviors of individuals owning the stock options are also described herein.

Organizations such as corporations commonly award employees stock options as part of their compensation to employees. It is sometimes necessary to ascribe a value to such stock options for inter alia tax purposes and financial reporting.

SUMMARY

Techniques for using a derivative security that is based on an underlying employee stock option award to determine a fair market price of the underlying employee stock option award are disclosed. The derivative security mimics the economic value of the employee stock options. The derivative security is based on underlying employee stock options and the maturity of the derivative security is tied to exercise and forfeiture behaviors of individuals owning the stock options. The terms of the security allow an investor to take into account employee behavior such as the employee's likelihood to exercise or forfeit the option. The value of the derivative security is determined by market interest in the derivative security (e.g., an auction can be used to price the derivative security where the price is set by the amount that investors are willing to pay for the derivative security) and this value of the derivative security may be used to determine the cost of options expenses by analyzing data for discovery of underlying relationships defined by unknown rules. The process uses a technology network that links market participants with a market or exchange, such as Nasdaq OMX, to provide broad access to investors to participate in price discovery for the derivative securities.

The techniques provide fair executions at a single price that is fully reflective of market demand for securities and produces an open process in which all investors have the ability to enter orders and to participate in price discovery.

The details of one or more example embodiments are set forth in the accompanying drawings and the description below. Other features, objects, and advantages will be apparent from the description and drawings, and from the claims.

DESCRIPTION OF DRAWINGS

FIG. 3 details an example of the security's maturity schedule with vested forfeiture.

FIG. 4 details an example of the security's maturity schedule with pre-vested forfeiture, alternative A.

FIG. 5 details an example of the security's maturity schedule with pre-vested forfeiture, alternative B.

FIG. 6 details an example of the security's maturity schedule with partial-vesting forfeiture, alternative A: pure forfeiture.

FIG. 7 details an example of the security's maturity schedule with partial-vesting forfeiture, alternative A: mixed forfeiture.

FIG. 8 details an example of the security's maturity schedule with partial-vesting forfeiture, alternative B: pure forfeiture.

FIG. 9 details an example of the security's maturity schedule with partial-vesting forfeiture, alternative B: mixed forfeiture.

DETAILED DESCRIPTION

Figure 1:
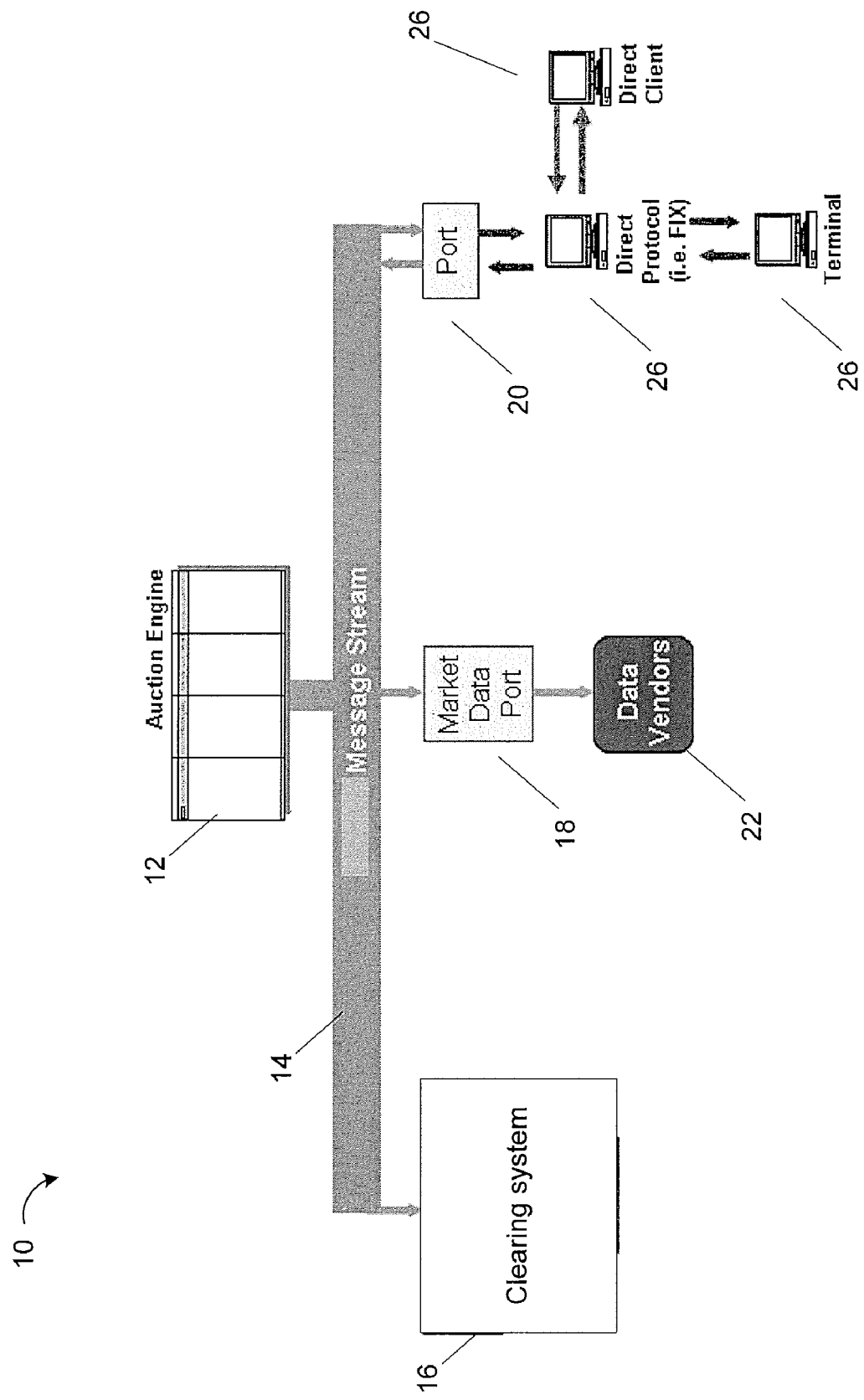
FIG. 1 is a block diagram of an auction schematic.

A computer system provides a liquid and efficient price discovery mechanism for securities, e.g., options that are based on employee stock option grants, which generally do not have an established valuation mechanism, so as to provide investors with market exposure to such employee stock options and to provide a pricing and valuation mechanism for the underlying employee stock options and the like. The securities mimic the economic value of the stock options. The method and systems that provide the valuation are referred to as an "Equity Value Indicator" (EVI). An auction mechanism, as described below, is used to determine the price for the securities at the time that the securities are initially issued and sold.

Investors can determine a price to bid for the securities based on a maturity schedule, as described in FIGS. 2-9. The maturity schedule provides details about how the security is structured. The maturity schedule provides information to the potential investor to enable the investor to take into account employee behavior when determining an amount to bid for the security. In general, the auction mechanism serves to price the derivative instrument (e.g., by enabling multiple investors to bid for the security, and matching the seller with one or more buyers who win the auction) while the maturity schedules provide information useful to the investors in determining an amount to bid for the security at the time of the auction (e.g., by providing information about how the security is structured and how the security works).

When the derivative security shares are generated, an auction system that implements the auction mechanism distributes all security shares through an execution (e.g., an auction) at the highest price at which all shares can be sold. In some examples, once the derivative security shares are initially sold using the auction system, the shares are not further traded on an exchange or other mechanism. Rather, the shares are held by the purchaser until a settlement date on which the purchaser can determine whether to redeem the shares or not. In some embodiments, a reserve price can be set by the issuer and if the reserve price is not met, then some or all of the securities are not sold. The system receives eligible bids and offers for the security through existing market or exchange interfaces, e.g., Nasdaq OMX, NYSE and so forth, for order entry. The system can determine and disseminate an Indicative Auction Price (IAP), e.g., the price at which all securities would be sold, at a time (e.g., ten minutes, thirty minutes, one hour, or more) prior to the execution.

In some examples, the auction mechanism can be used to match a single seller of the securities (e.g., the entity generating the securities or a broker entity) with one or more buyers. The mechanism can be executed with multiple bids and a single offer, or, alternatively, multiple offers and single bid, multiple bids and multiple offers, or a single bid and a single offer. A delay in the auction can occur if volatility in the security's price is detected.

The security can be an equity security, a debt security, or a derivative security. The security can be registered or unregistered. The security can be listed for secondary trading or unlisted. The security can be previously listed or an original issuance. The security can be a non-marketable or marketable. One preferred example of a security is described in the following paragraph. The derivative securities that mimic the economic value of the employee stock options can be "Non-marketable securities," Non-marketable securities are those securities that cannot be readily bought or sold. Conventionally, non-marketable securities are characterized as having an undetermined or theoretical price estimated from, for example, a valuation formula. Examples of non-marketable securities include, but are not limited to, employee stock options, restricted share plan awards, performance-based securities benefits plan awards, and stock-appreciation rights awards.

In some embodiments, a security in the auction can be issued by, or on behalf of, a single issuer. Alternatively or in addition, a security in the auction can be purchased by, or on behalf of, a single purchaser. Auction information can include, for example, an IAP that can be based on current bids and offers, paired units that represent the number of units matched for execution at an IAP, and an imbalance and a size of unexecuted units at the IAP.

Referring to FIG. 1, an example auction system 10 is shown. Details of a computer system to provide the auction system 10 are set forth below. The auction system 10 can be used to match a seller of the security with one or more buyers of the securities. The price of the security is set based on the bids presented by the potential buyers. These bids can be based, at least in part, on one or more maturity schedules which explain how the security is structured (e.g., as described below in relation to FIGS. 2-9).

The auction system 10 includes an auction engine 12 and a message stream 14 to connect various components of the auction system 10. In some examples, the message stream 14 connects a clearing system 16 with a market data port 18 and additional ports 20 to the auction system 10. The clearing system 16 can include a system such as the National Securities Clearing Corporation (NSCC) or other clearing systems for securities transactions.

Data vendors (e.g., broker/dealers) access the auction engine 12 by using existing interfaces (e.g., a market data port 18) for order entry. Other users (e.g., investors, corporations) receive and transfer data to the auction engine 12 by using computers 24 that are connected to port 20, e.g., by a network using an established protocol. The auction information is disseminated through existing market or exchange systems such as the Net Order Imbalance Indicator, which is available via, e.g., a trading platform such as NASDAQTrader.com and a data feed.

In some examples, the system 10 begins accepting bids or offers at a pre-determined time for the start of the auction. The auction information (e.g., IAP information) can be disseminated starting at a specified time (e.g., ten minutes, thirty minutes, one hour, or more) prior to the scheduled auction close. The auction information is updated and posted at regular intervals (e.g., every few seconds, tens of seconds, minute, or minutes). These regular intervals change periodically (e.g., every minute for the first 45 minutes, and every 15 seconds thereafter). Other durations and frequencies of data dissemination are possible.

In some examples, entered orders can be cancelled. Bids and/or offers can be entered until the scheduled time of the auction close and generally executions do not occur prior to the auction close.

At a close of an auction, an execution occurs at a price that is determined as described above. After the close of an auction, final auction information is disseminated to all participants and the execution clears through a clearing system (e.g., NSCC or other clearing systems for securities transactions). A "quote-only" time period can be extended if the price change is greater than a fixed threshold amount (either absolute or relative) during the pre-defined period prior to the scheduled close of the auction. There can be extensions of the quote-only period for a fixed and known time period in the auction time. In the event of additional price moves, extensions can continue up to a fixed and predetermined number of times. Cancellation can be restricted if the auction is extended more than the predetermined number of times.

Orders can be priced orders or un-priced orders. All orders that are not executed in the auction are cancelled in the absence of secondary market trading. If secondary market trading were to occur, orders not executed could be cancelled or held open for the secondary market.

The execution priority can be determined based on, for example, a price and timestamp of entered bids and/or offers. The execution algorithm determines the price at which the greatest number of securities could be sold without "trading through" any unexecuted limit bids or offers. In the event of multiple prices satisfying this condition, the highest clearing price can be selected in the case of a single seller, or the lowest clearing price in the case of a single buyer. In the case of multiple buyers and sellers or a single buyer and single seller, another benchmark can be selected to ensure a unique clearing price.

Description of the Maturity Schedule Process

The maturity schedule associated with a derivative security that mimics the value of an employee stock option provides users with a pricing and valuation mechanism for the security based on the employee stock options. The maturity schedule provides information about the structure of the security that is used during the auction to determine how much to bid for the security. The maturity schedule provides information and terms of the security that help the investor to take into account considerations such as employee behavior when determining an amount to bid for the security. The employee behavior includes exercise/forfeiture behaviors which are not known at the time of pricing of the security. This allows the potential investor to take into account how the employee is predicted to behave such that the employee's predicted behavior in exercising or forfeiting the options can be factored into a price that the potential investor is willing to pay for the security.

The table below depicts rules and fields for the derivative security that are used as part of a technique to enable a potential investor to determine a valuation for a security that is based on issued employee stock options. These derivative securities can be securities that have a conditional maturity. Their price is determined by supply and demand in the market and the derivative securities are based on the underlying employee stock options. If exercised by investors, the options are settled in cash or alternatively can be settled in shares, e.g., generally common stock in the entity that issued the security. Other shares can be used to settle such as preferred shares, etc.

A number of business days (e.g., one, two, three, or more) after the end of the quarterly reference time period, the Issuer or its agent notifies holders of the security of valuation and/or settlement. Individual units can expire on a specified number of business days after notification.

Figure 2:
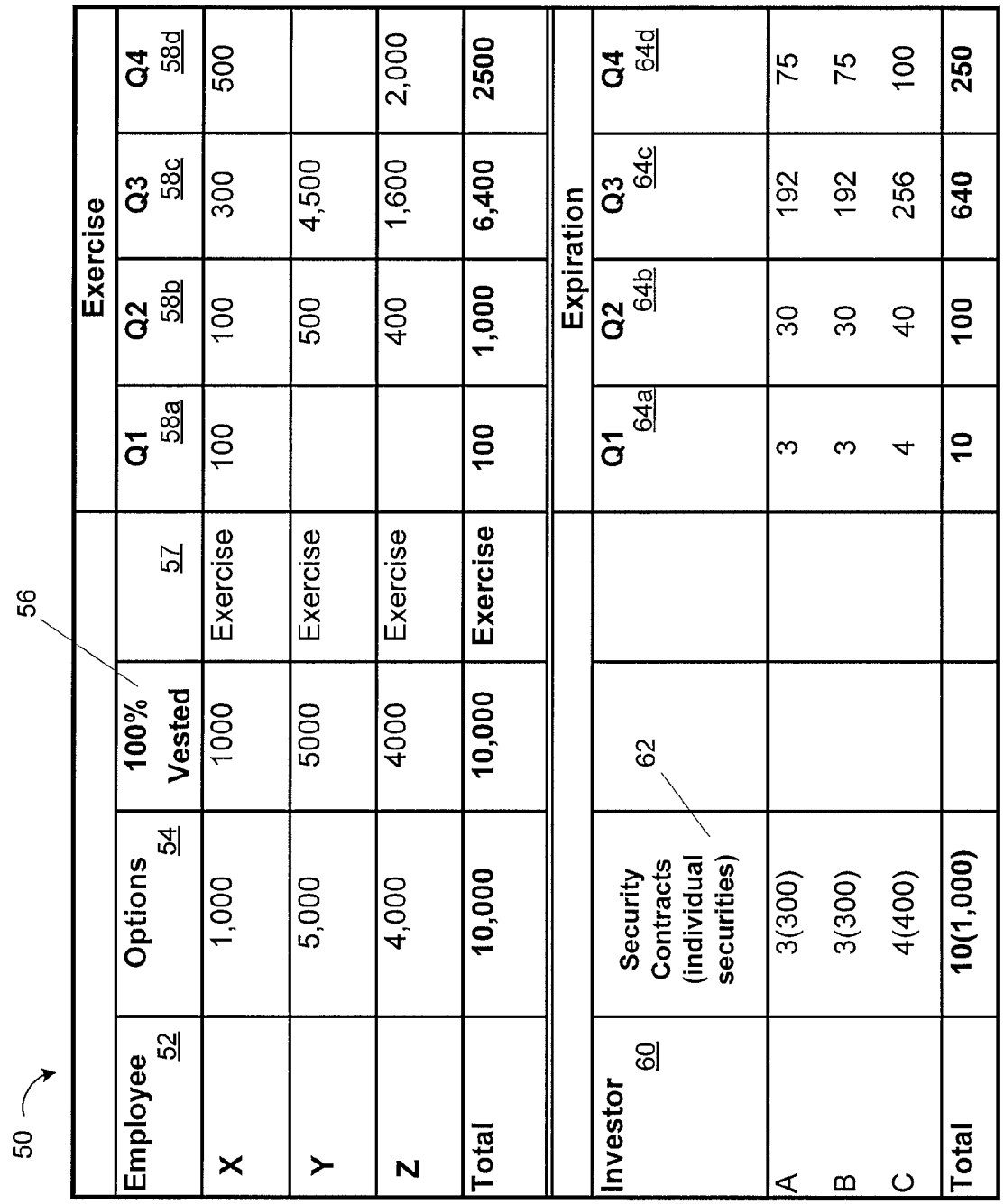
FIG. 2 details an example of the security's maturity schedule with 100% vesting and no forfeiture.
Figure 10:
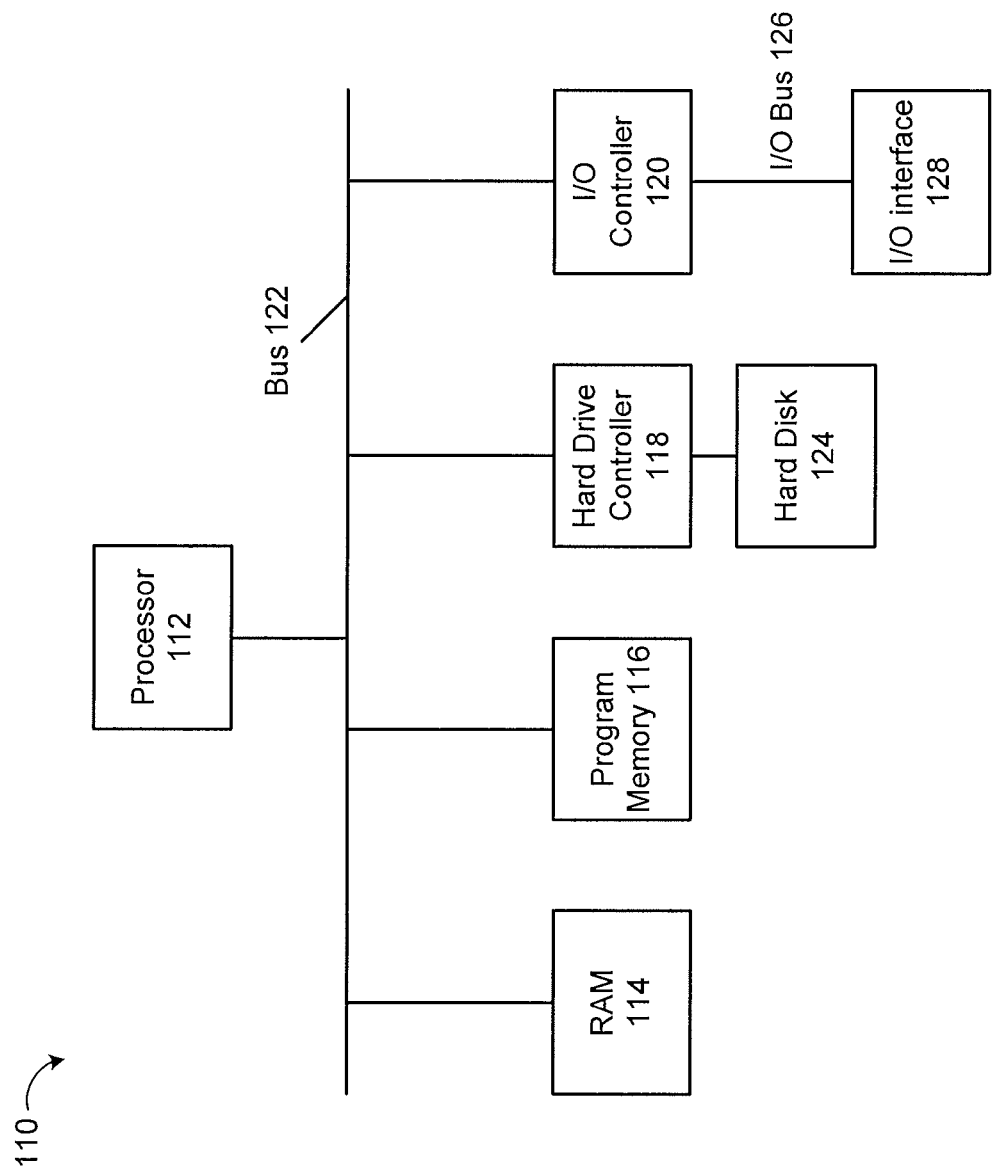
FIG. 10 is a block diagram of a computer system.

Referring to table 50 in FIG. 2, a column 52 lists three employees: employee X, employee Y, and employee Z. A column 54 lists the number of option units associated with each employee: 1,000 option units for Employee X, 5,000 for Employee Y, and 4,000 for Employee Z. A column 56 lists the

TABLE 1

Fields used in an Maturity schedule system

| Field | Rule or Description |
|---|---|
| Issuer | For example, a company or its agent |
| Buyer | Determined by an auction among participant member firms |
| Price | Determined by auction |
| Strike Price | Strike price of corresponding Employee Stock Options (Reference ESOs). The Board Committee designated to administer Equity Incentive Plan, in its sole discretion, shall establish the strike price at the time the Employee Stock Options are granted. |
| Vesting | All ESOs issued can be considered Reference ESOs. Non-vested ESOs can be handled as described under the Non-Vesting Mechanism. |
| Maturity Type | European or American as described below. |
| Reference Time Period | For example, bi-quarterly, quarterly, yearly. |
| Notification Date | The notification date can be a number of business days after the end of the Reference Time Period. |
| Notification | An issuer (or their agent) can notify Holders (e.g., via first class mail). |
| Form of Settlement | For example, shares or cash at sole discretion of Issuer (or their agent). |
| Transferability by Buyer | Can be unrestricted. Units can be eligible for deposit at a Depository Trust Company (DTC) or other clearing agency. |
| Hedging by Buyer | Can be unrestricted. |
| Maturity | The earlier of: (a) maturity of Reference ESOs at which time units can mature as a European option or; (b) at the end of the Reference Time Period, the number of individual units determined to be mature per the Tranche Structure described below, can expire a number of business days following the Notification Date, as an American option |
| Contract size | There can be a number of units (e.g., 100) initially per contract and the contract size can decrease as units mature. The contracts may not be divisible by Buyer. |
| Tranche Structure | Each contract has a number of individual units (e.g., 100). Each Reference Time Period, the Issuer or their agent determines the percentage of Reference ESOs that have been exercised and forfeited during the Reference Time Period. A number of Maturing units (which can be called "Appreciation Rights Securities") in each contract corresponding to the percentage of Reference ESOs exercised and forfeited can then convert to European style settlement. Using the Rounding Rule, the total percentage of Reference ESOs both exercised and forfeited is rounded to the nearest whole percentage following the first reference time period. The number of Maturing units correspond to that percentage. For subsequent time periods, the number of Maturing units equal the rounded cumulative percentage of Reference ESOs both exercised and forfeited as of the end of the period less the cumulative rounded percentage of Reference ESOs both exercised and forfeited from the previous period. |
| Rounding Rule | Contracts can round down to the nearest whole percentage for fractional amounts less than 0.5 percent, and round up to the nearest percentage for fractional amounts equal to or greater than 0.5 percent. |

EXAMPLES

Example 1

A Maturity Structure for an Equity Value Indicator

In one example, the maturity schedule provides a pricing and valuation mechanism for a given securities (e.g., employee stock options). The maturity schedule provides information about the structure of the security and allows a potential investor to take into account potential employee behavior when determining a price to bid for the security. The maturity schedule shows how the tracking security (e.g., the derivative instrument) has a value that is tied to the exercise behavior of the employees owning the stock options and allows the pricing of the security to reflect the employee behavior. One example of employee behavior and its effect on the associated security is provided below.

number of option units listed in the column 54 that are 100% vested from the beginning of the first quarter. Looking at the total for column 54 and 56, there are a total number of 10,000 options available. As shown in the investor portion of FIG. 2, 1,000 security contracts are based on the 10,000 options. These security contracts are owned by three different investors, investor A, investor B, and investor C. The value of the security contracts owned by investors A, B, and C as well as the expiration dates of the security contracts are tied to the options contracts owned by Employees X, Y, and Z. As such, the value of the security contracts owned by investors A, B, and C will be affected by the exercise of the employee option units by Employees X, Y, and Z.

A column 57 lists whether an employee has chosen to exercise or forfeit his options for a given time period (e.g., a quarter). Columns 58a, 58b, 58c, and 58d each list the number of options exercised or forfeited during a specific time period.

(In this example, columns 58*a-d* only list the number of options exercised, but in other examples below, both the number of options exercised and the number of options forfeited are included.) In this example, a percentage of the total number of options exercised during a given time period (e.g., a quarter) by all employees determines the number of securities (e.g., EVIs, ARS) that will be maturing. In this example, ten percent of the total number of options have been exercised during the quarter and an equivalent percentage of securities (e.g., EVIs, ARS) will be expiring following the quarter and the holder(s) of the maturing securities must decide whether or not to exercise their maturing securities.

The maturity of the derivative securities are tied to the exercise dates of the employee options. For example, when a percentage of the employee options on which the security is based are exercised (or forfeited), the same percentage of the derivative securities reach maturity. Upon maturity, the owner of the derivative securities decides whether or not to exercise their maturing securities.

In FIG. 2, 58*a* corresponds to the first quarter; 58*b*, the second quarter; 58*c*, the third quarter; 58*d*, the fourth quarter. In a first quarter 58*a*, Employee X exercises 100 of his options, Employee Y exercises none of his options, and Employee Z exercises none of his options. Thus, during the first quarter, a total of 100 options have been exercised representing 1% of the options associated with all employees. Consequently, 10 of the securities owned by investors A, B, and C are due to mature and available to the investors for exercise.

A column 60 lists investors A, B, and C, whose number of contracts is listed in column 62 as equal to 3, 3, and 4 contracts, respectfully. Such contracts can be referred to as "Appreciation Rights Securities" contracts. In this example, there are 100 units of "individual Appreciation Rights Securities" per contract, there are a total number of 300, 300, and 400 security units for investors A, B, and C, respectively.

Columns 64*a*, 64*b*, 64*c*, and 64*d* each list the number of units (e.g., individual Appreciation Rights Securities) due to mature during a specific time period. In FIG. 2, 64*a* corresponds to the first quarter; 64*b*, the second quarter; 64*c*, the third quarter; 64*d*, the fourth quarter. In the first quarter, as shown in column 64*a*, Investor A had 3 units mature, Investor B had 3 units mature, and Investor C had 4 units mature. As such the first quarter, a total of 10 units, or 1% of the contracts, matured. This percentage is equivalent to the percentage of employee options exercised by Employees X, Y, and Z.

As shown in column 58*b*, in the second quarter, Employee X exercises 100 of his options, Employee Y exercises 500 of his options, and Employee Z exercises 400 of his options. Also shown in column 64*b*, in the second quarter, Investor A has 30 units mature, Investor B has 30 units mature, and Investor C has 40 units mature. In the third quarter and shown in column 58*c*, Employee X exercises 300 of his options, Employee Y exercises 4,500 of his options, and Employee Z exercises 1,600 of his options. Also in the third quarter and shown in column 64*c*, Investor A has 192 units mature, Investor B has 192 units mature, and Investor C has 256 units mature. In the fourth quarter and shown in column 58*d*, Employee X exercises 500 of his options, Employee Y exercises none of his options, and Employee Z exercises 2,000 of his options. Also in the fourth quarter and shown in column 64*d*, Investor A has 75 units mature, Investor B has 75 units mature, and Investor C has 100 units mature. At the end of the fourth quarter, all 10,000 employee options have been exercised and all 10 Appreciation Rights Securities contracts (and 1,000 individual Appreciation Rights Securities units) have matured.

Knowing the maturity structure of the units enables investors to estimate valuations to assign to the Appreciation Rights Securities. The market price for the purchased units can be set by the highest price at which all Appreciation Rights Securities contracts can be sold. The execution of purchased units can clear through the clearing system 16 (e.g., NSCC).

Example 2

An Maturity Structure with Forfeiture

In some examples a maturity schedule can include both information about the exercise of options by an employee and information about the forfeiture of options by an employee. At the time the security based on the options is generated and purchased by investor, the number of options that will be exercised versus the number of options that will be forfeited in any given period is unknown. Therefore, the investor can insert relative percentages or numbers of options that the investor predicts will be exercised or forfeited and determine a value to bid for the security based on the estimated numbers. One such example is provided below.

Referring to FIG. 3, a table 75 lists similar data as in the table 50. Employees X, Y, and Z each have the same number of options as in example 1, and all options are 100% vested from the beginning of the first quarter. One difference is that the column 57 in table 75 explicitly lists whether an employee has chosen to exercise or forfeit his options for a given time period (e.g., a quarter). Whether an employee will exercise or forfeit an option is not known at the time that the investor purchases the security, however, the maturity schedule allows the investor to consider the potential employee behavior when determining a price to bid for the security. Another difference is that, in this example, a percentage of the total number of options exercised and forfeited during a given time period (e.g., a quarter) by all employees determines the number of securities that will be maturing.

In this example, as in example 1, ten percent of the total number of options have been exercised or forfeited during the first quarter. Also as in example 1, an equivalent percentage of securities will be expiring following the quarter, and the holder(s) of the maturing securities thus will decide whether or not to exercise their maturing securities. In a first quarter 58*a*, Employee X exercises 100 of his options, Employee Y exercises none of his options, and Employee Z exercises none of his options. In the first quarter, as shown in column 64*a*, Investors A and B each has 3 units mature and Investor C has 4 units mature.

Referring to column 58*b*, in the second quarter, Employee X exercises 100 of his options, Employee Y exercises 500 of his options, and Employee Z exercises 400 and forfeits 3,600 of his options. As shown in column 64*b*, in the second quarter, Investors A and B each has 138 units mature and Investor C has 184 units mature. In the third quarter as shown in column 58*c*, Employee X exercises 300 of his options, Employee Y exercises 4,500 of his options, and Employee Z exercises none of his options. Also in the third quarter and shown in column 64*c*, Investors A and B have 144 units mature apiece and Investor C has 192 units mature. In the fourth quarter and shown in column 58*d*, Employee X exercises 500 of his options and neither Employee Y nor Employee Z exercises any of his options. Also in the fourth quarter and shown in column 64*d*, Investors A and B have 15 units mature apiece and Investor C has 20 units mature. At the end of the fourth quarter, all 10,000 employee options have been exercised or forfeited and all 10 Appreciation Rights Securities contracts (and 1,000 individual Appreciation Rights Securities units) have matured. When the derivative units mature, the investor makes a decision of whether to exercise the derivative units.

Example 3

A Maturity Structure with Pre-Vesting Forfeiture, Alternative A

In some examples a maturity schedule can include information about the exercise and forfeiture of options by an employee and about the pre-vesting forfeiture of options by the employee. At the time the security based on the options is generated and purchased by investor, the number of options that will be exercised versus the number of options that will be forfeited (either at the time of the option maturity or by pre-vesting forfeiture) in any given period is unknown. Therefore, the investor can insert relative percentages or numbers of options that the investor predicts will be exercised or forfeited and determine a value to bid for the security based on the estimated numbers. One such example is provided below.

Referring to FIG. 4, a table 80 lists similar data as in the table 75. Employees X, Y, and Z each have the same number of options as in examples 1 and 2. In this example, one difference is that none of Employee Z's options are 100% vested (as listed in the column 56 in the table 80). As such, Employee Z will not be able to exercise any of his 4,000 options. In addition, the options of Employee X and Employee Y do not become 100% vested until the beginning of the second quarter; thus, Employees X and Y can only exercise his options in the second, third, or fourth quarters.

As in example 2, a percentage of the total number of options exercised or forfeited during a given time period (e.g., a quarter) by all employees determines the number of securities that will be maturing.

In a first quarter 58a, none of Employee X, Employee Y, or Employee Z exercises any of his options. Employee Z, who does not have any vested options and therefore could not exercise any options, forfeits all 4,000 of his options. Employee Z will not participate further in later quarters. Also in the first quarter, as shown in column 64a, Investors A and B each has 120 units mature and Investor C has 160 units mature.

As shown in column 58b, in the second quarter, Employee X exercises 200 of his options and Employee Y exercises 500 of his options. As shown in column 64b, in the second quarter, Investors A and B each has 21 units mature and Investor C has 28 units mature. In the third quarter and shown in column 58c, Employee X exercises 300 of his options and Employee Y exercises 600 of his options. Also in the third quarter and shown in column 64c, Investors A and B have 27 units mature apiece and Investor C has 36 units mature. In the fourth quarter and shown in column 58d, Employee X exercises 500 of his options and Employee Y exercises 3,900 options. Also in the fourth quarter and shown in column 64d, Investors A and B have 132 units mature apiece and Investor C has 176 units mature. At the end of the fourth quarter, all 10,000 employee options have been exercised or forfeited and all 10 Appreciation Rights Securities contracts (and 1,000 individual Appreciation Rights Securities units) have matured.

Example 4

An Auction Mechanism with Pre-Vesting Forfeiture, Alternative B

In some examples a maturity schedule can include information about the exercise and forfeiture of options by an employee. At the time the security based on the options is generated and purchased by investor, the number of options that will be exercised versus the number of options that will be forfeited (either at the time of the option maturity or by pre-vesting forfeiture) in any given period is unknown. Therefore, the investor can insert relative percentages or numbers of options that the investor predicts will be exercised or forfeited and determine a value to bid for the security based on the estimated numbers. One such example is provided below.

Referring to FIG. 5, a table 85 lists similar data as in the table 80. This example is identical to example 3, except that the percentage of the total number of options exercised during a given time period (e.g., a quarter) by all employees is calculated relative to the number of vested, rather than issued, options. This percentage then determines the number of securities that will be maturing. Thus, no options are available in the first quarter because no options were 100% vested for Employee X, Employee Y, or Employee Z. Investors A, B, and C will divide their individual Appreciation Rights Securities contracts between the second, third, and fourth quarters.

The exercise and forfeiture of options for Employees X, Y, and Z are identical to those for example 3. Referring to column 64b, in the second quarter, Investors A and B each has 35 units mature and Investor C has 46.6667 units mature, which is rounded up to 47 units mature. In the third quarter and shown in column 64c, Investors A and B has 45 units mature apiece and Investor C has 60 units mature. In the fourth quarter, shown in column 64d, Investors A and B has 220 units mature apiece and Investor C has 293.333 units mature, which is rounded down to 293 units mature. At the end of the fourth quarter, all 10,000 employee options have been exercised or forfeited and all 10 Appreciation Rights Securities contracts (and 1,000 individual Appreciation Rights Securities units) have matured.

Example 5

An Auction Mechanism with Partial Vesting Forfeiture and Pure Forfeiture, Alternative A In some examples a maturity schedule can include information about the exercise and forfeiture of options by an employee and about partial vesting forfeiture and pure forfeiture. At the time the security based on the options is generated and purchased by investor, the number of options that will be exercised versus the number of options that will be forfeited in any given period is unknown. Therefore, the investor can insert relative percentages or numbers of options that the investor predicts will be exercised or forfeited and determine a value to bid for the security based on the estimated numbers. One such example is provided below.

Referring to FIG. 6, a table 90 lists similar data as in the table 75. Employees X, Y, and Z each have the same number of options as in examples 1-4. In a first quarter 58a, Employee X exercises 100 options and neither Employee Y nor Employee Z exercises any of his options. Also in the first quarter, as shown in column 64a, Investors A and B have 3 units mature apiece and Investor C has 4 units mature.

As shown in column 58b, in the second quarter, Employee X exercises 100 of his options, Employee Y exercises 500 of his options, Employee Y exercises 400 of his options. Referring to column 64b, in the second quarter, Investors A and B each has 30 units mature and Investor C has 40 units mature. In the third quarter and shown in column 58c, neither Employee X nor Employee Y exercises any of his options, and Employee Z forfeits 3,600 of his options. Also in the third quarter and shown in column 64c, Investors A and B have 108 units mature apiece and Investor C has 144 units mature.

In the fourth quarter and shown in column 56, Employees X and Y have become 100% vested for all of their options. As shown in column 58d, Employee X exercises 800 of his options and Employee Y exercise 4,500 of his options. Also in the fourth quarter and shown in column 64d, Investors A and B each has 159 units mature and Investor C has 212 units mature. At the end of the fourth quarter, all 10,000 employee options have been exercised or forfeited and all 10 Appreciation Rights Securities contracts (and 1,000 individual Appreciation Rights Securities units) have matured.

Example 6

An Auction Mechanism with Partial Vesting Forfeiture and Mixed Forfeiture, Alternative A In some examples a maturity schedule can include information about the exercise and forfeiture of options by an employee and about partial vesting forfeiture and mixed forfeiture. At the time the security based on the options is generated and purchased by investor, the number of options that will be exercised versus the number of options that will be forfeited in any given period is unknown. Therefore, the investor can insert relative percentages or numbers of options that the investor predicts will be exercised or forfeited and determine a value to bid for the security based on the estimated numbers. One such example is provided below.

Referring to FIG. 7, a table 95 lists similar data as in the table 90 in example 5. Employees X, Y, and Z each have the same number of options as in examples 1-5. In this example, one difference is that there are two rounds of activity in the third quarter. In a first round of activity in the third quarter, Employee X exercises 300 of his options, Employee Y exercises 600 of his options, and Employee Z exercises 1,600 of his options. Also in the first round of activity in the third quarter, Investors A and B have 75 units mature apiece and Investor C has 100 units mature. During a second round of activity in the third quarter, Employee Z forfeits 2,000 of his options, thus making 200 more units mature for the investors.

As shown in column 64c, Investors A and B each has an additional 60 units mature, for a total of 135 units for the third quarter, and Investor C has an additional 80 units mature, for a total of 180 units for the third quarter.

In the fourth quarter and shown in column 58d, Employee X exercises 500 of his options, Employee Y forfeits 3,900 of his options, and Employee Z does not exercise or forfeit any of his options. Also in the fourth quarter and shown in column 64d, Investors A and B have 132 units mature apiece and Investor C has 176 units mature. At the end of the fourth quarter, all 10,000 Appreciation Rights Securities contracts (and 1,000 individual Appreciation Rights Securities units) have matured.

Example 7

An Auction Mechanism with Partial Vesting Forfeiture and Pure Forfeiture, Alternative B In some examples a maturity schedule can include information about the exercise and forfeiture of options by an employee and about partial vesting forfeiture and pure forfeiture. At the time the security based on the options is generated and purchased by investor, the number of options that will be exercised versus the number of options that will be forfeited in any given period is unknown. Therefore, the investor can insert relative percentages or numbers of options that the investor predicts will be exercised or forfeited and determine a value to bid for the security based on the estimated numbers. One such example is provided below.

Referring to FIG. 8, a table 100 lists similar data as in the table 90 in example 5. Employees X, Y, and Z each have the same number of options as in examples 1-6. All options of all employees are 100% vested beginning in the first quarter. In this example, a percentage of the total number of options exercised, but not forfeited, during a given time period (e.g., a quarter) by all employees determines the number of securities that will be maturing. In this example, ten percent of the total number of options have been exercised during the quarter and an equivalent percentage of securities (e.g., EVIs or ARS) will be expiring following the quarter and the holder(s) of the maturing securities must decide whether or not to exercise their maturing securities.

The activity during the first and second quarters by Employees X, Y, and Z and Investor A, B, and C is the same as in examples 5 and 6. In the third quarter, as shown in column 58c, neither Employee X nor Employee Y exercises or forfeits any of his options, and Employee Z forfeits 3,600 of his options.

In the fourth quarter and shown in column 58d, Employee X exercises 800 of his options, and neither Employee Y nor Employee Z exercises or forfeits any of his options. Also in the fourth quarter and shown in column 64d, Investors A and B have 267 units mature apiece and Investor C has 356 units mature. At the end of the fourth quarter, all 10,000 Appreciation Rights Securities contracts (and 1,000 individual Appreciation Rights Securities units) have matured.

Example 8

An Auction Mechanism with Partial Vesting Forfeiture and Pure Forfeiture, Alternative B In some examples a maturity schedule can include information about the exercise and forfeiture of options by an employee and about partial vesting forfeiture and pure forfeiture. At the time the security based on the options is generated and purchased by investor, the number of options that will be exercised versus the number of options that will be forfeited in any given period is unknown. Therefore, the investor can insert relative percentages or numbers of options that the investor predicts will be exercised or forfeited and determine a value to bid for the security based on the estimated numbers. One such example is provided below.

Referring to FIG. 9, a table 105 lists similar data as in the table 90 in example 5. Employees X, Y, and Z each have the same number of options as in examples 1-7. All options of all employees are 100% vested beginning in the first quarter. In this example, a percentage of the total number of options exercised, but not forfeited, during a given time period (e.g., a quarter) by all employees determines the number of securities that will mature during that period. In this example, ten percent of the total number of options have been exercised during the quarter and an equivalent percentage of securities (e.g., EVIs or ARS) will be expiring following the quarter and the holder(s) of the maturing securities must decide whether or not to exercise their maturing securities.

The activity during the first and second quarters by Employees X, Y, and Z and Investor A, B, and C is the same as in examples 5, 6, and 7. In this example, as in example 6, there are two rounds of activity in the third quarter. In a first round of activity in the third quarter, Employee X exercises 300 of his options, Employee Y exercises 600 of his options, and Employee Z exercises 1,600 of his options. Also in the first round of activity in the third quarter, Investors A and B have 75 units mature apiece and Investor C has 100 units mature. During a second round of activity in the third quarter, Employee Z forfeits 2,000 of his options, thus making 200 more options available to investors by changing the denominator used to determine the percentage of eligible options exercised. Referring to column 64c, Investors A and B each has an additional 27 units mature, for a total of 102 units for the third quarter, and Investor C has an additional 36 units mature, for a total of 136 units for the third quarter.

In the fourth quarter and shown in column 58d, Employee X exercises 500 of his options, Employee Y forfeits 3,900 of his options, and Employee Z does not exercise or forfeit any of his options. Also in the fourth quarter and shown in column 64d, Investors A and B have 165 units mature apiece and Investor C has 220 units mature. At the end of the fourth quarter, all 10,000 Appreciation Rights Securities contracts (and 1,000 individual Appreciation Rights Securities units) have matured.

Other examples are shown herein.

The technology described can be implemented in digital electronic circuitry, or in computer hardware, firmware, software, or in combinations thereof. Apparatus of the technology described can be implemented in a computer program product tangibly embodied in a machine-readable storage device for execution by a programmable processor; and method actions can be performed by a programmable processor executing a program of instructions to perform functions by operating on input data and generating output.

The technology described can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Suitable processors include, by way of example, both general and special purpose microprocessors. Generally, a processor can receive instructions and data from a read-only memory and/or a random access memory. Generally, a computer can include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD_ROM disks. Any of the foregoing can be supplemented by, or incorporated in, ASICs (application-specific integrated circuits).

One such type of computer includes a programmable processing system suitable for implementing or performing the apparatus or methods described. The system includes a processor, a random access memory (RAM), a program memory (for example, a writable read-only memory such as a flash ROM), a hard drive controller and an input/output (I/O) controller coupled by a processor bus. The system can be preprogrammed, in ROM, for example, or it can be programmed (and reprogrammed) by loading a program from another source (for example, from a floppy disk, a CD-ROM, or another computer). The computer can be a stand-alone computer or a computer server, that is part of a network of such computers as commonly encountered in electronic trading environments.

An example of one such type of computer is shown in FIG. 9, which shows a block diagram of a programmable processing system 110 suitable for implementing or performing the apparatus or methods described herein. The system 110 can include a processor 112, a random access memory (RAM) 114, a program memory 116 (e.g., a writeable read-only memory (ROM) such as a flash ROM), a hard drive controller 118, and an input/output (I/O) controller 120 coupled by a processor (CPU) bus 122. The system 110 can be pre-programmed, in ROM, for example, or it can be programmed (and reprogrammed) by loading a program from another source (for example, from a floppy disk, a CD-ROM, or another computer).

The hard drive controller 118 can be coupled to a hard disk 124 suitable for storing executable computer programs and data including storage. The I/O controller 120 can be coupled to an I/O bus 126 to an I/O interface 128. The I/O interface 128 can receive and transmit data in analog or digital form over communication links such as a serial link, local area network, wireless link, and parallel link.

This application incorporates by reference in their entireties U.S. patent application Ser. No. 10/835,510, filed Apr. 8, 2004 and entitled "Closing In An Electronic Market" and U.S. patent application Ser. No. 11/077,503, filed Mar. 9, 2005 and entitled "Opening Cross in Electronic Market."

An execution environment includes computers running an operating system and browsers. Other environments could of course be used.

A number of example embodiments have been described. Nevertheless, it can be understood that various modifications may be made without departing from the spirit and scope of the claims. Accordingly, other embodiments are within the scope of the claims.

What is claimed is:

1. A computer-implemented method comprising:
   determining, by a computer-implemented auction system, a market price of a derivative security that represents exposure to the economic value of an employee stock option by:
   providing, by the computer-implemented auction system, to a potential investor, a maturity schedule that associates expected employee behavior with the performance of the derivative security;
   receiving, by an exchange system interface port, bids or offers at a pre-determined time prior to the start of an auction, the received bids being based at least in part on the maturity schedule and the expected employee behavior;
   determining, by the computer-implemented auction system, price information for the derivative security prior to a scheduled auction close;
   disseminating, by the exchange interface port, the determined price information for the derivative security to auction participants; and
   closing, by the computer-implemented auction system, the auction and executing on a computer orders and bids for the security at the determined price.

2. The method of claim 1 wherein the method receives multiple bids against a single offer.

3. The method of claim 1 wherein the method receives multiple offers and a single bid.

4. The method of claim 1 wherein the method receives multiple bids and multiple offers.

5. The method of claim 1 wherein the method receives a single bid and a single offer.

6. The method of claim 1 further comprising:
recording, in a non-volatile storage of the computer, settlement information of the derivative security based on the number of shares or a representation of a cash amount.

7. The method of claim 1 wherein the auction information includes a price, paired units, and unexecuted units at a determined price.

8. The method of claim 1 wherein the auction information is disseminated at a specified time, prior to the executing and information is posted at a first rate during a first period.

9. The method of claim 1 wherein an execution priority is determined based on price and timestamp of entered bids or offers.

10. The method of claim 1 wherein an amount of time monitoring prices of the security is increased when a percentage change in the price of the security prior to the release is greater than a threshold value during a predetermined interval prior to a scheduled close of the auction.

11. The method of claim 1, further comprising posting information at a second rate during a second period.

12. A computer-implemented auction system comprising:
an auction engine, implemented by one or more computers and in communication with an exchange system interface port, configured to determine a market price of a derivative security that represents exposure to the economic value of an employee stock option by:
providing to a potential investor a maturity schedule that associates expected employee behavior with the performance of the derivative security;
receiving, by the exchange system interface port, bids or offers at a pre-determined time prior to the start of an auction, the received bids being based at least in part on the maturity schedule and the expected employee behavior;
determining price information for the derivative security prior to a scheduled auction close;
disseminating, via the exchange interface port, the determined price information for the derivative security to auction participants; and
closing the auction and executing orders and bids for the security at the determined price.

13. The auction system of claim 12, wherein the auction engine is configured to receive multiple bids against a single offer.

14. The auction system of claim 12, wherein the auction engine is configured to receive multiple offers and a single bid.

15. The auction system of claim 12, wherein the auction engine is configured to receive multiple bids and multiple offers.

16. The auction system of claim 12, wherein the auction engine is configured to receive a single bid and a single offer.

17. The auction system of claim 12, further comprising a memory, wherein the auction engine is configured to record in the memory information of the derivative security based on the number of shares or a representation of a cash amount.

18. The auction system of claim 12, wherein the auction information includes a price, paired units, and unexecuted units at a determined price.

19. The auction system of claim 12, wherein the auction engine is configured to disseminate the auction information at a specified time, prior to the execution, and post information at a first rate during a first period.

20. The auction system of claim 19, wherein the auction engine is configured to post information at a second rate during a second period.

21. The auction system of claim 12, wherein the auction engine is configured to determine an execution priority based on a price and a timestamp of entered bids or offers.

22. The auction system of claim 12, wherein the auction engine is configured to increase an amount of time monitoring prices of the security when a percentage change in the price of the security prior to the release is greater than a threshold value during a predetermined interval prior to a scheduled close of the auction.

* * * * *